United States Patent [19]

Glasgow

[11] 4,418,360

[45] Nov. 29, 1983

[54] IMAGE PROCESSING

[75] Inventor: John A. Glasgow, Great Baddow, England

[73] Assignee: The Marconi Company Limited, Chelmsford, England

[21] Appl. No.: 325,742

[22] Filed: Nov. 30, 1981

[30] Foreign Application Priority Data

Dec. 3, 1980 [GB] United Kingdom ............ 8038765

[51] Int. Cl.³ ................................................ H04N 3/36
[52] U.S. Cl. ................................ 358/108; 358/222; 358/214; 358/54
[58] Field of Search ............. 358/54, 93, 101, 97, 358/105, 107, 108, 160, 180, 214–216, 222, 125, 126, 113, 185; 355/40, 41, 50, 52; 364/515, 516

[56] References Cited

U.S. PATENT DOCUMENTS

| | | | |
|---|---|---|---|
| 3,772,465 | 11/1973 | Vlahos et al. | 358/22 |
| 3,824,336 | 7/1974 | Gould et al. | 358/214 |
| 4,220,967 | 9/1980 | Ichida et al. | 358/105 |
| 4,297,725 | 10/1981 | Shimizu et al. | 358/125 |

FOREIGN PATENT DOCUMENTS

| | | |
|---|---|---|
| 321243 | 11/1929 | United Kingdom . |
| 329383 | 5/1930 | United Kingdom . |
| 779297 | 7/1957 | United Kingdom . |
| 1198903 | 7/1970 | United Kingdom . |
| 1279809 | 6/1972 | United Kingdom . |
| 1285554 | 8/1972 | United Kingdom . |
| 1298339 | 11/1972 | United Kingdom . |
| 1302899 | 1/1973 | United Kingdom . |

*Primary Examiner*—Michael A. Masinick
*Attorney, Agent, or Firm*—Spencer & Frank

[57] ABSTRACT

Pictures produced by a camera are corrected to eliminate the effect of camera shake or of unwanted movement of the camera relative to the subject being viewed. Using the apparatus of FIG. 1 the adjustments required for each frame of a cine film are established by displaying each frame on a screen 9 and using a light pen 10 to record the co-ordinates of two characteristic features, e.g. bright spots, on each frame. Circuitry 13, 14, 16, 17, 20, 21, 22, 23 calculates from these co-ordinates the correction in x and y directions, tilt and magnification required for each frame. The correction values are stored in a recorder 24 in association with the appropriate frame number derived from a film drive 2.

The cine film is then re-filmed using equipment (not shown) which allows adjustment of the original film relative to the new film, and adjustment of magnification. This re-filming allows the appropriate corrections to each frame to be made by manual or automatic adjustment of the re-filming equipment in response to the correction values recorded at 24.

14 Claims, 2 Drawing Figures

IMAGE PROCESSING

BACKGROUND OF THE INVENTION

This invention relates to a method and apparatus for processing images derived from a camera or other surveillance apparatus which is subject to unwanted movement relative to a subject of interest in the field of view. The invention arose as a proposal for overcoming the problem of instability of hand-held cine cameras or hand-held television cameras. It would, however, also be applicable to cameras located on unstable platforms such as aircraft, ships, road vehicles etc. The invention may also be useful for the purpose of processing the outputs from radar, sonar, infra red and other similar surveillance apparatus. Another application of the invention is in circumstances where the camera or other surveillance equipment is stable relative to the ground but where the subject being surveyed is moving relative to the ground.

SUMMARY OF THE INVENTION

Accordingly it is an object of this invention to compensate for unwanted movements between a camera or other surveillance apparatus and an object under observation.

According to one aspect of the invention there is provided an image processing method in which: an output from surveillance apparatus is processed to produce representations of a subject viewed by the surveillance apparatus; at least two characteristic features are detected in each representation and the manner of processing is adjusted for different representations so as to tend to fix the co-ordinates of both features in each of the representations whereby effects of unwanted movement of the surveillance apparatus relative to the subject are reduced.

The adjustment is preferably performed by recognising characteristic or outstanding features of the output of the surveillance equipment, e.g. one or more bright spots on the pictures produced by a camera, noting the positions of these bright spots or other characteristic features, and then adjusting or reproducing the pictures so that the positions of the characteristic features on each picture are the same.

In the case of a cine film adjustments can easily be performed by using an original film, in which successive frames display the relative displacement which it is desired to eliminate, to produce a second film. During the exposure of each frame of the second film the position of the latter and its attitude may be adjusted so as to locate the subject of interest at substantially the same position or at positions which follow deliberate panning movement of the camera on successive frames.

BRIEF DESCRIPTION OF THE DRAWING

Further features of the invention will appear from the following description of one way in which the invention may be performed, this description being given with reference to the accompanying drawing in which.

DESCRIPTION OF THE PREFERRED EMBODIMENTS

Figure 1:
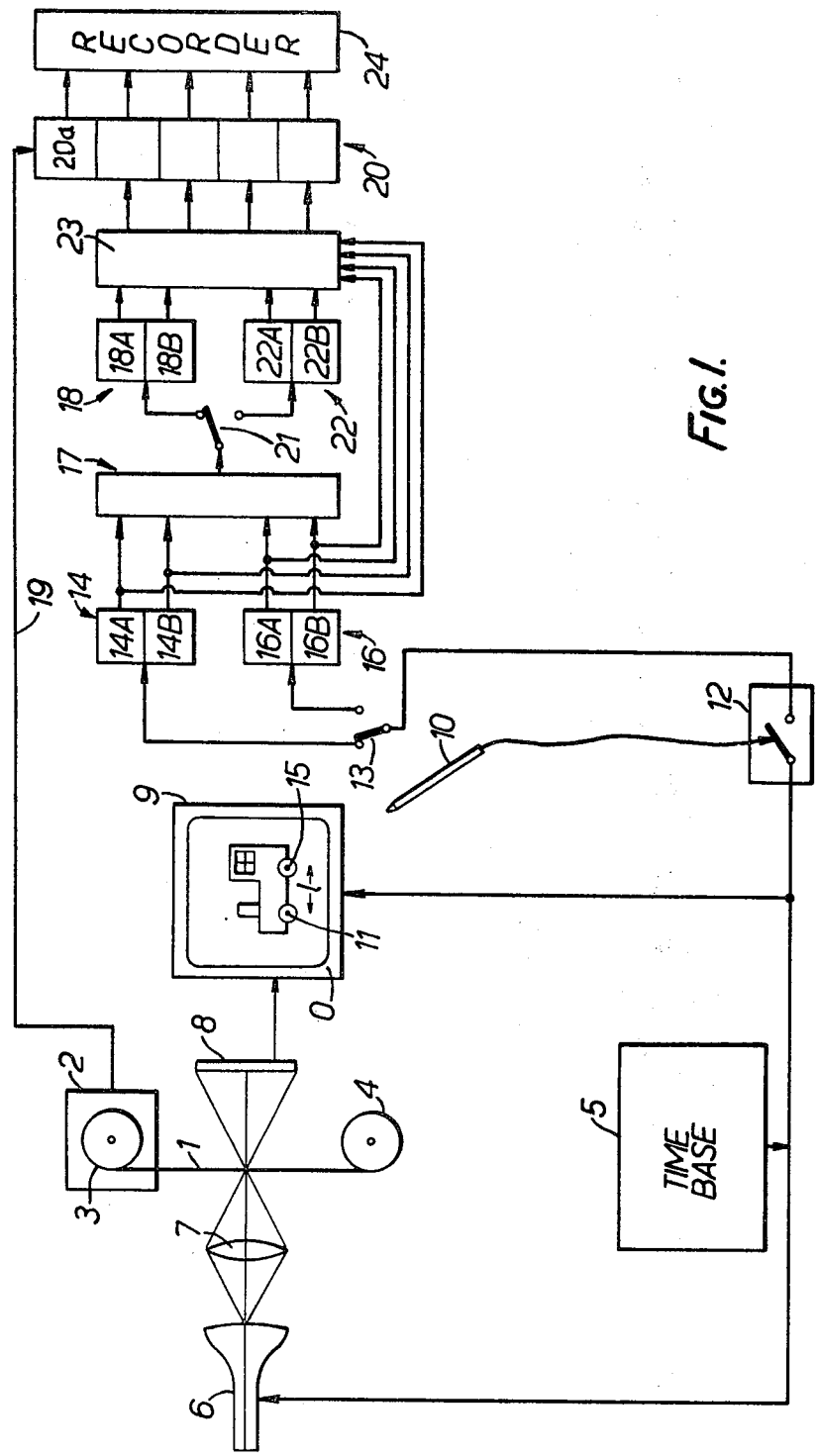
FIG. 1 shows an apparatus for recording the way in which each frame of a cine film needs to be adjusted in order to remove the effect of camera shake.
Figure 2:
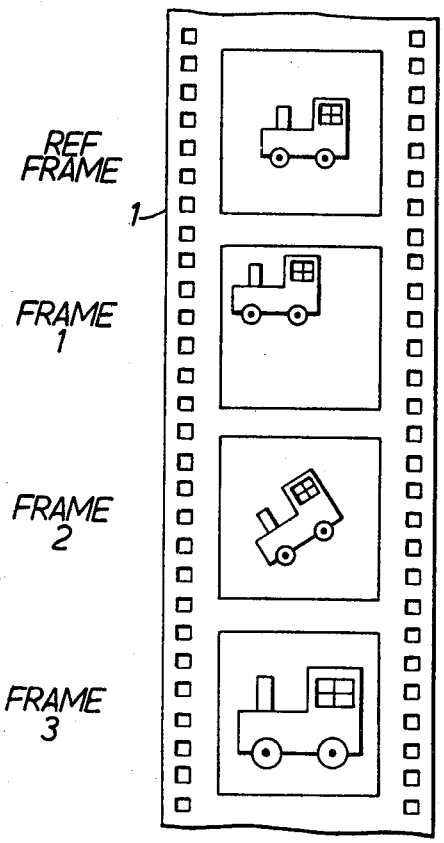
FIG. 2 shows a reference frame and three subsequent frames of the cine film which it is desired to correct.

Referring firstly to FIG. 1 a film 1 is driven, by a drive 2, from a reel 3 to a reel 4. As each frame reaches a position mid-way between the reels 3 and 4 the film is stopped. The position will first be described when the reference frame, shown at the top of FIG. 2, is stopped at this position.

A time base circuit 5 produces x and y deflection signals which are fed to a flying spot scanner 6 to produce a spot on its screen which scans in x and y co-ordinates. This spot is focused onto the film frame which it also scans across in x and y co-ordinates, the brightness of the light transmitted through the film thus being modulated in such a way that it represents a coded representation of the picture. The brightness is detected by a photodetector 8 which receives all the light transmitted though the film and the output signal from the photodetector 8 is used to control the brightness of a cathode ray tube display 9 whose time base is derived from the same circuit 5.

A light pen 10 which is constituted by a holder carrying a photosensor is placed by an operator on a point of the picture as depicted on the display 9 which point represents a first reference point. For example the operator may choose the point 11 as a first reference point. The light pen closes the switch 12 at instants when the point 11 is scanned by the time base applied to the display 9 thus allowing appropriate time base signals denoting the x and y co-ordinates of the point 11 to pass through switch 13 to a register 14 where the co-ordinates $x_{1R}$, $y_{1R}$ with reference to the origin O of the reference point 1 are entered.

The switch 13 is then moved to its righthand position as illustrated in FIG. 1 and the process is repeated for a second reference point, e.g. reference point 15. The co-ordinates $x_{2R}$, $y_{2R}$ of this point 15 are thus entered in a register 16 at 16a and 16b respectively.

A calculator 17 calculates from the contents of registers 14 and 16 the slope $S_R$ of the line between the reference points 11 and 15. This slope is given by the equation $S_R = \text{TAN}^{-1} (y_{2R}-y_{1R})/(x_{2R}-x_{1R})$. This slope value $S_R$ is entered in part 18A of a register 18. The calculator 17 also calculates the length $1_R$ of the line between reference points 1 and 15, this being $\sqrt{[(x_{2R}-x_{1R})^2+(y_{2R}-y_{1R})^2]}$. This value $1_R$ is entered into the register part 18b.

The film is now driven by the drive 2 to frame 1 (as shown in FIG. 2) and the film drive then produces a signal on line 19 indicating the frame number, this number being entered in a section 20A of a register 20. On any particular frame n the subject is probably displaced in x and y directions so that the reference points 11 and 15 have moved to new co-ordinate $x_{1N}$, $y_{1N}$ and $x_{2N}$, $y_{2N}$. The switch 21 is now moved to its lower position and the light pen is used as before to enter the values $x_{1N}$, $y_{1N}$ and $x_{2N}$, $y_{2N}$ in the register 16. The slope and length of the new line between the reference points 11 and 15 are entered in part 22a and 22b of a register 22.

A calculator 23 now calculates four correction values as follows (a) x correction which equals the difference between the content of 14a and 16a.

(b) y correction which equals the difference between the content of register parts 14b and 16b.

(c) the slope direction which equals the difference between 18a and 22a.

(d) magnification which equals the ratio of 18b and 22b.

These four values are entered in the register 20 alongside the frame number signal in section 20a. The content of the register 20 are recorded at 24 and the whole process is then repeated for subsequent frames.

In the particular example shown in FIG. 2 it will be apparent that an x and y correction will be required to frame 1; a slope correction will be required for frame 2; and an x and y correction and a magnification correction will be required for frame 3.

The end result of the procedure described so far is a recording containing, for each frame, a list of corrections (x, y, slope and magnification) required. Each frame of the film is now printed or used to produce a corresponding frame of a new film, this being done using a conventional enlarger of the type which allows adjustment of the data or film being exposed in x and y directions, in rotation about the optical axis and in magnification. These adjustments are made by hand according to the values recorded by recorder 24. Alternatively a conventional enlarger could be modified with the provision of suitable servomotors and worm drives so as to provide automatic adjustment in accordance with signals received from the recorder 23. The end result is a series of exposures on the new film like those shown in FIG. 2 but with the subject viewed at the same location, orientation and magnification as in the reference frame.

The various corrections made will result in the edges of adjacent frames being out of register with each other. This will result in edge portions of the film when finally viewed as a motion picture, being unclear. Any such unclear edges can be masked off but this results in loss of data. Alternatively, the enlarger or printer can be arranged to print, in addition to the image, appropriate neutral shades or colours in those areas of the new film which has no image content.

It is emphasised that the illustrated embodiment of the invention is only one example of many ways in which the invention may be performed. For example the invention can also be applied to recordings of television picture signals which may be processed in a similar way to that shown in FIG. 1. However the adjustments of x and y co-ordinates, slope and magnification can, in the case of T.V. pictures, be effected electronically. Another way of effecting such adjustments is to use an optical system capable of deflecting, rotating and magnifying an image. In another embodiment of the invention a light pen or other manual system is used to enter reference points such as 11 and 15 on a reference frame into a register like that shown at 14 but to use electronic means to enter the location of corresponding points of subsequent frames into a register like that shown at 16.

I claim:

1. A method of processing successive frames of information from surveillance apparatus to produce respective representations of a subject viewed by the surveillance apparatus, the method comprising detecting at least two characteristic features in each frame and adjusting the manner of processing for different frames so as to tend to fix the co-ordinates of both features in each of the representations whereby effects of unwanted movement of the surveillance apparatus relative to the subject are reduced.

2. A method according to claim 1 in which the surveillance apparatus is a camera.

3. A method according to claim 1 in which the surveillance apparatus includes an infra-red detector.

4. A method according to claim 1 in which the surveillance apparatus includes a radar system.

5. A method according to claim 1 in which the co-ordinates are fixed so as to follow a panning movement of the surveillance apparatus.

6. A method according to any preceding claim in which the processing involves adjustment of cartesian co-ordinates and an angular co-ordinate of a characteristic feature.

7. A method according to claim 1 in which the processing involves adjustment of the size of a feature of the subject, as depicted by each representation.

8. A method according to claim 1 in which the characteristic features are bright or dark spots.

9. A method according to claim 1 in which each characteristic feature is the brightest spot within a given area of the subject, which area includes a characteristic feature of a previously processed frame.

10. Apparatus for processing successive frames of information defining a subject viewed by a surveillance apparatus which is subject to unwanted movement relative to the subject, the apparatus including means for identifying the location of two characteristic features of each frame of information and means for producing a representation of the subject from each frame of information in a manner which is adjusted from frame to frame so as to tend to fix the co-ordinates of both features in the representations thereby eliminating the effects of the said unwanted movement.

11. Apparatus according to claim 10 including means for identifying the location of a characteristic feature of the subject as defined by a frame of information from the surveillance apparatus, noting its co-ordinates, comparing the co-ordinates with desired co-ordinates and adjusting the representation so as to tend to bring said co-ordinates to the desired values.

12. Apparatus according to claim 11 including means for shifting the co-ordinates in two orthogonal directions.

13. Apparatus according to claim 11 including means for rotating the co-ordinates about a predetermined point.

14. Apparatus according to claim 11 including means for adjusting the magnification of the representations so as to eliminate the effects of unwanted increases and decreases in the distance between the apparatus and the said subject.

* * * * *